United States Patent
Zondiner

(10) Patent No.: US 9,527,687 B2
(45) Date of Patent: Dec. 27, 2016

(54) PRINTING APPARATUS AND METHODS

(71) Applicant: Hewlett-Packard Industrial Printing Ltd., Fort Collins, CO (US)

(72) Inventor: Ehud Zondiner, Netanya (IL)

(73) Assignee: Hewlett-Packard Industrial Printing LTD., Netanya (IL)

( * ) Notice: Subject to any disclaimer, the term of this patent is extended or adjusted under 35 U.S.C. 154(b) by 0 days.

(21) Appl. No.: 14/864,302

(22) Filed: Sep. 24, 2015

(65) Prior Publication Data

US 2016/0009515 A1 Jan. 14, 2016

Related U.S. Application Data

(63) Continuation of application No. 14/320,178, filed on Jun. 30, 2014, now Pat. No. 9,309,068.

(30) Foreign Application Priority Data

Jul. 30, 2013 (EP) .................... 13178656

(51) Int. Cl.
*B65H 3/14* (2006.01)
*B65H 3/12* (2006.01)
(Continued)

(52) U.S. Cl.
CPC ............. *B65H 3/122* (2013.01); *B41J 11/06* (2013.01); *B41J 13/0072* (2013.01); *B65H 1/04* (2013.01); *B65H 1/08* (2013.01); *B65H 1/26* (2013.01); *B65H 1/266* (2013.01); *B65H 3/0816* (2013.01); *B65H 5/04* (2013.01); *B65H 5/10* (2013.01); *B65H 5/222* (2013.01); *B65H 7/02* (2013.01); *B65H 11/00* (2013.01); *B65H 29/241* (2013.01); *G06K 15/16* (2013.01); *B65H 2301/44336* (2013.01); *B65H 2405/12* (2013.01); *B65H 2405/32* (2013.01); *B65H 2406/342* (2013.01);
(Continued)

(58) Field of Classification Search
CPC ............... B65H 1/04; B65H 1/08; B65H 1/22; B65H 1/26; B65H 1/266; B65H 3/08; B65H 3/0808; B65H 3/0816; B65H 3/122; B65H 11/00; B65H 11/02; B65H 2301/44336; B65H 2406/342; B65H 5/04; B65H 5/10; B65H 2405/32; B65H 2402/31; B65H 29/241; B65H 5/222; B65H 2405/12
See application file for complete search history.

(56) References Cited

U.S. PATENT DOCUMENTS

| | | | |
|---|---|---|---|
| 5,287,164 A | 2/1994 | Watanabe | |
| 5,472,183 A * | 12/1995 | Kubo | ........ B65H 1/08 271/110 |
| 6,123,329 A * | 9/2000 | Sato | ........ B65H 1/14 271/145 |
| 6,619,792 B1 * | 9/2003 | Roberts | ........ B41J 11/06 271/118 |

(Continued)

FOREIGN PATENT DOCUMENTS

DE 4212439 A1 10/1993
JP H06183586 A 7/1994

*Primary Examiner* — Prasad Gokhale
(74) *Attorney, Agent, or Firm* — HP Inc. Patent Department

(57) ABSTRACT

Printing apparatus comprise a printing table, a loader to load sheets of print media to the printing table, and a moveable tray on which at least one row of media sheets can be placed, the tray being moveable between a position in which it is accessible to an operator for placing media sheets thereon and another position in which at least part of the tray is accessible to the loader for picking the print media sheets but inaccessible to the operator.

6 Claims, 6 Drawing Sheets

(51) Int. Cl.

| | |
|---|---|
| *B41J 11/06* | (2006.01) |
| *B41J 13/00* | (2006.01) |
| *B65H 5/04* | (2006.01) |
| *B65H 5/22* | (2006.01) |
| *B65H 1/04* | (2006.01) |
| *B65H 1/08* | (2006.01) |
| *B65H 1/26* | (2006.01) |
| *B65H 3/08* | (2006.01) |
| *B65H 5/10* | (2006.01) |
| *B65H 7/02* | (2006.01) |
| *B65H 11/00* | (2006.01) |
| *G06K 15/16* | (2006.01) |
| *B65H 29/24* | (2006.01) |

(52) U.S. Cl.
CPC ....... *B65H 2407/10* (2013.01); *B65H 2801/15* (2013.01)

(56) References Cited

U.S. PATENT DOCUMENTS

| | | | |
|---|---|---|---|
| 8,398,069 B2* | 3/2013 | Chae | B65H 1/266 271/164 |
| 2008/0192075 A1 | 8/2008 | Campion et al. | |
| 2008/0265500 A1* | 10/2008 | Katsuyama | B21D 43/20 271/264 |
| 2009/0152798 A1* | 6/2009 | Dangelewicz | B65H 3/0816 271/14 |
| 2009/0174134 A1* | 7/2009 | Wong | B65H 1/266 271/9.08 |
| 2009/0200728 A1 | 8/2009 | Sugiyama | |
| 2010/0206194 A1 | 8/2010 | Lehner et al. | |
| 2011/0253871 A1* | 10/2011 | Bett | B65H 5/04 248/346.03 |
| 2013/0001850 A1* | 1/2013 | Okano | B65H 31/00 271/3.14 |
| 2013/0032989 A1 | 2/2013 | Okuchi et al. | |
| 2014/0054838 A1* | 2/2014 | Kotaka | B65H 1/00 271/3.14 |

\* cited by examiner

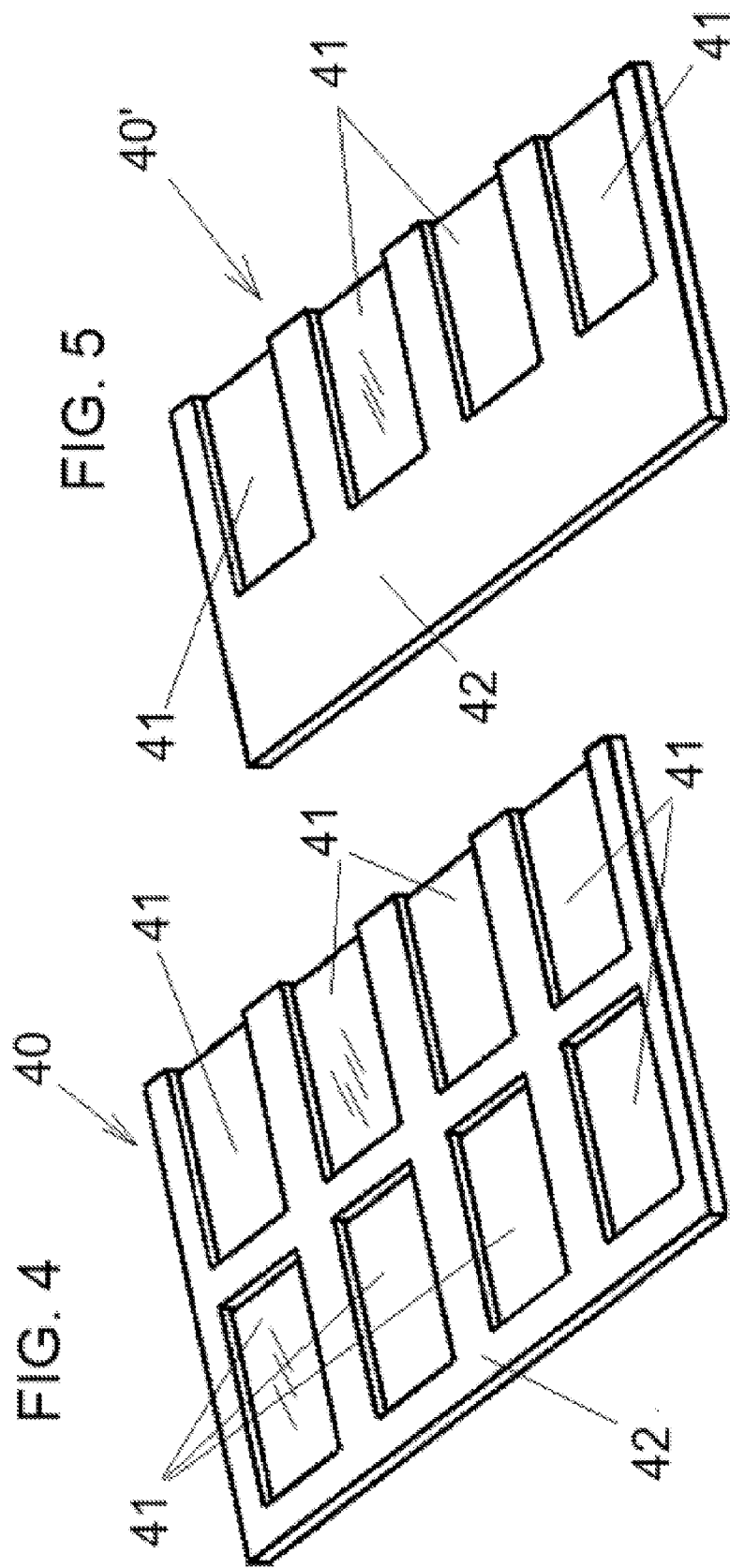

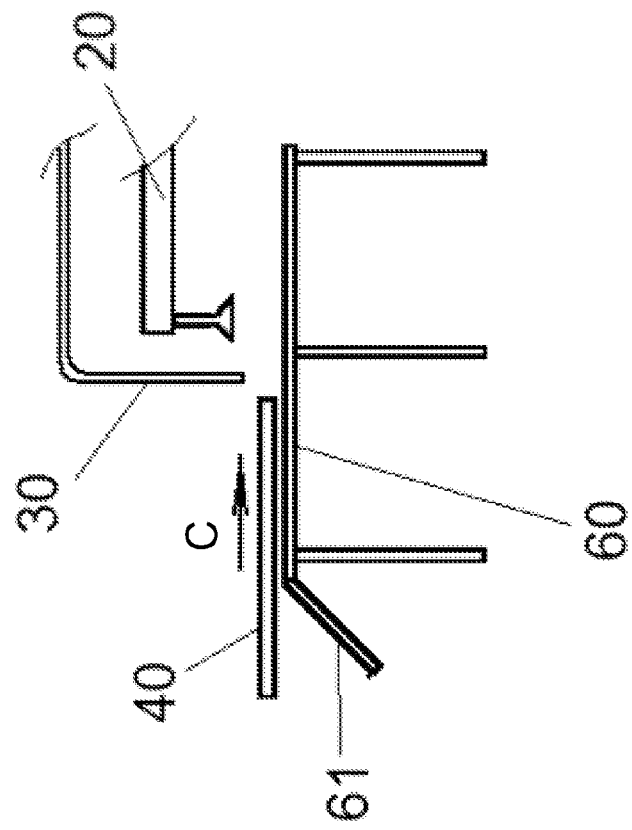
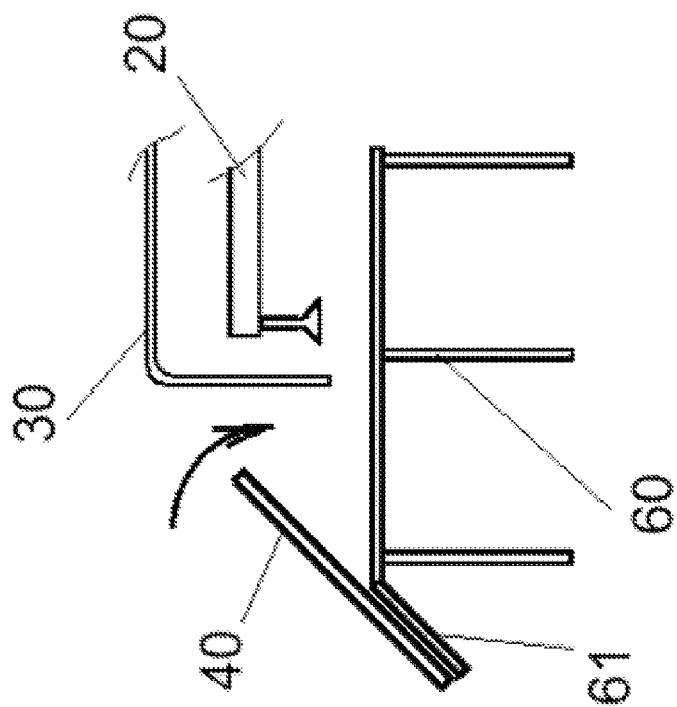
FIG. 6

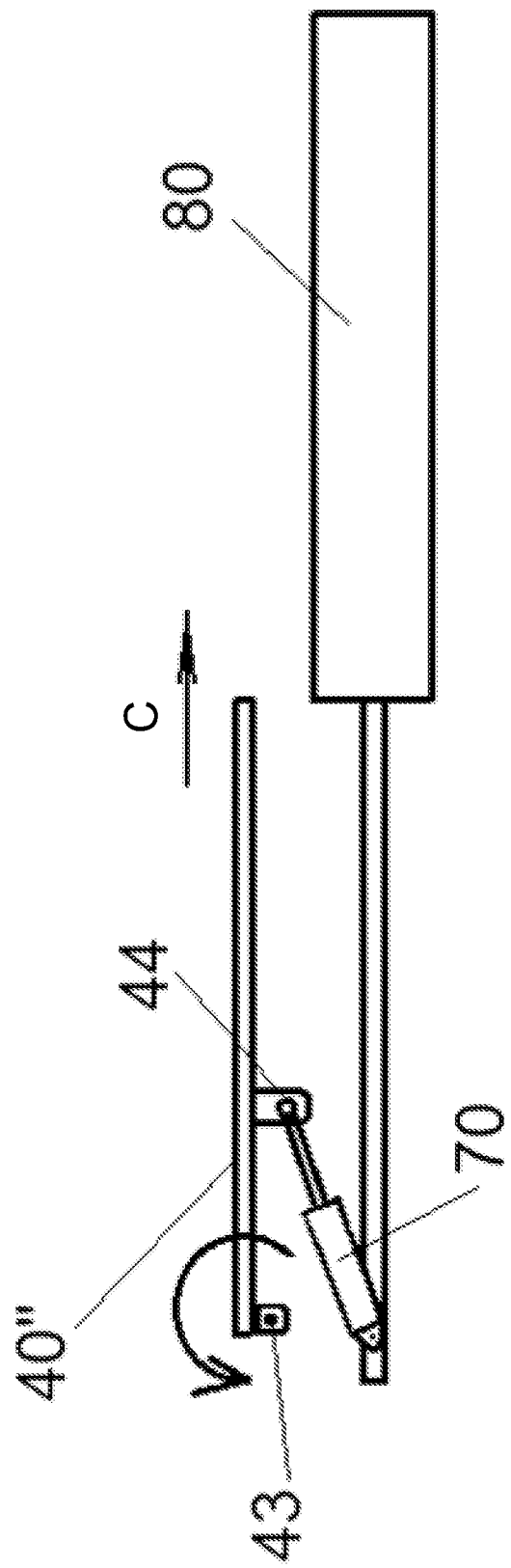

PRINTING APPARATUS AND METHODS

RELATED DOCUMENTS

The present application is a continuation of U.S. application Ser. No. 14/320,178 filed Jun. 30, 2014, which claims the benefit under 35 U.S.C. §119(b) of European Patent Application No. 13178656.1, filed Jul. 30, 2013. These applications are herein incorporated by reference in their entireties.

BACKGROUND

Large format flatbed printers may be employed to print signs, banners, posters or the like, on rigid or flexible sheets of media of several materials, sizes and thicknesses. The sheets may be printed while supported on a printing table: suitable loaders, for example having vacuum cups, may be provided to pick up media sheets from a loading top or surface, transfer them to the printing table, and remove them from the printing table after printing.

The loading top may generally be arranged on one side of the printer. An operator, or an automatic pre-set loading machinery, may place on the loading top a large media sheet to be printed, or a row of several smaller media sheets, parallel to each other and aligned in a direction at right angles with respect to the movement of the loader. The loader may then pick up and transfer to the printing table the large sheet, using several vacuum cups; in the case of a row of sheets, it can pick up the sheets of the row using one or more cups for each sheet, and transfer several sheets at the same time to the printing table.

For security reasons, a cover may enclose the loader, leaving only a low elongate opening in correspondence with the loading top, allowing the passage of the sheets of media. The operator may thus place a sheet on the loading top, pushing the sheet such that its leading edge slips under the cover through the opening and reaches a position where part of the sheet is accessible and may be picked up by the loader. The operator is therefore isolated from the loader at all times.

BRIEF DESCRIPTION OF THE DRAWINGS

Some non-limiting examples of devices which may be employed to monitor a media roll mounted in a printing apparatus will be described in the following with reference to the appended drawings, in which:

The accompanying drawings illustrate various examples of the principles described herein and are a part of the specification. The illustrated examples are given merely for illustration, and do not limit the scope of the claims.

FIGS. 4 and 5 schematically shows in perspective view examples of moveable trays of printing apparatus as described herein, FIG. 6 schematically shows an example of a printing apparatus as described herein with a tiltable tray; and FIG. 7 schematically shows an example of a tray with a tilting arrangement and a driving arrangement.

DETAILED DESCRIPTION

In flatbed printers such as mentioned above, in which an operator places print media sheets on a stationary loading top, sheets can only be introduced under the cover of the loader up to a certain depth, because the operator must hold them and push them, slipping the leading edge under the cover. Consequently, only one row of sheets may be made accessible to the loader, the loader can only pick the sheets in one position, and only one row of sheets can therefore be loaded on the printing table for a printing operation.

According to some examples, printing apparatus, such as a large format flatbed digital printer, as provided herein comprise a printing table and a loader to load sheets of print media to the printing table, and further comprise a moveable tray on which at least one row of media sheets can be placed; this tray is moveable between a position in which it is accessible to an operator for placing media sheets thereon and another position in which at least part of the tray is accessible to the loader for picking the print media sheets, but is inaccessible to the operator.

A tray moveable between these two positions allows improving throughput of the apparatus without affecting the operator's security, because the tray may be safely positioned under the cover at several depths, including a depth that is larger than the sheet dimension in the direction of the depth: it is not necessary to leave part of the sheet outside the cover. Sheets can therefore be made accessible to the loader at least at two depth positions, such that more than one row of sheets may be picked and placed on the printing table for a printing operation; and this without the need for the operator to reach the area of influence of the loader.

Figure 1:
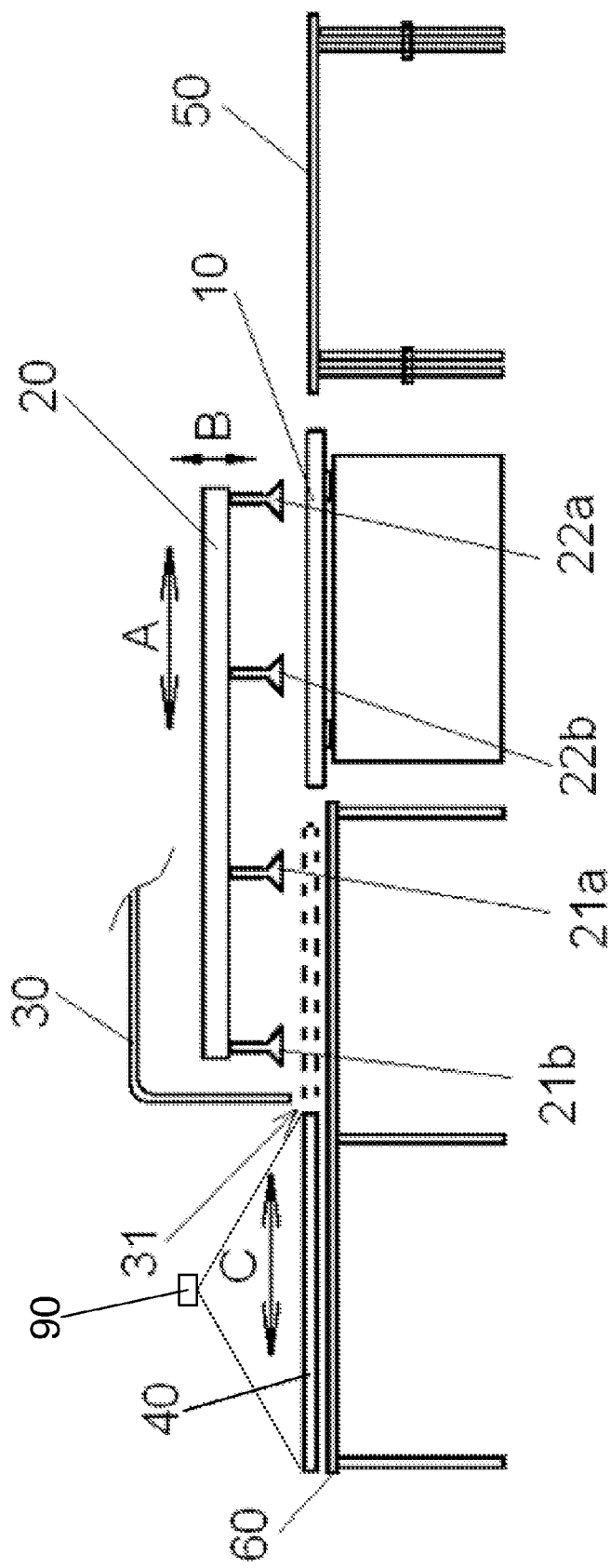
FIG. 1 schematically shows in elevation view an example of a printing apparatus as provided herein.

FIG. 1 is an elevation view of an example of a printing apparatus, which may be a large format flatbed printer, with a printing table 10 and a loader 20 to load sheets of print media to the printing table 10.

The loader may be provided with suction cups, for example two sets of cups 21a-21b and 22a-22b, each with two rows of cups as shown in the figure to pick up, transport and release two rows of sheets of print media. The loader 20 may be enclosed at least partly by a safety cover 30, to prevent an operator from being injured by interfering with the movement of the loader.

The loader 20 may move horizontally, as shown by arrow A, and the suction cups may be raised and lowered as shown by arrow B in order to approach in each case the surface from which the sheets have to be picked or the surface on which they have to be placed.

The apparatus may further comprise a moveable tray 40, on which at least one row of media sheets (not shown in FIG. 1) can be placed.

In the present specification a "row" of sheets, or a "row" of suction cups, is intended to designate a number of sheets or cups that are aligned in a direction which is horizontal and at right angles to the horizontal movement of the loader, i.e. the direction of arrow A of FIG. 1. A row of sheets may include two or more sheets, but also a single sheet.

The tray 40 may be moveable, for example as shown by arrow C, between a position (in solid lines in FIG. 1) in which it is accessible to an operator for placing media sheets thereon, and another position (in dashed lines in FIG. 1) in which at least part of the tray 40 is accessible to the loader 20 for picking the print media sheets, but inaccessible to an operator that is manually laying sheets of print media on the tray 40.

With the layout of FIG. 1, an operator may be positioned at the left hand side of the figure.

The tray 40 may be made inaccessible to the operator either by a safety cover enclosing at least partly the loader, such as cover 30 in FIG. 1, or by implementing other safety provisions to prevent the operator from reaching the part of the tray that is under the influence of the loader (for example the position in dashed lines in FIG. 1).

However, in some examples, part of the tray may remain accessible to the operator also in the position in which another part of the tray is accessible to the loader: for example, the side of the tray that is remote from the loader and the printing table may remain accessible to the operator in order to be pulled back once the loader has emptied it.

The cover 30 may leave a low elongate opening 31 in order to allow the passage of the tray 40 under the cover, towards the position where it is accessible to the loader 20.

As shown in FIG. 1 a printing apparatus as disclosed may also comprise a reception table or lift 50, on which the loader may place the printed sheets after they have been printed.

In some examples the tray 40 may be slidable horizontally between the two positions: for example, it may be slidable over a structure 60 (FIG. 1) with a smooth upper surface, guides, or other supporting arrangements.

A printing method as disclosed herein may comprise, according to some examples:
placing at least one row of media sheets on a moveable tray, such as tray 40 shown in FIG. 1;
moving said tray to a position, such as the position shown in dashed lines in FIG. 1, where at least part of the tray is accessible to a loader 20 and inaccessible to an operator; and
causing the loader 20 to pick media sheets from the tray 40 and load them to a printing table 10 in a printing apparatus.

In some examples, the tray 40 may be moved to the position where at least part of it is accessible to the loader 20 by sliding it horizontally.

An example of a printing method will be described in more detail in the following with reference to FIG. 2, which schematically shows an example of a printing apparatus in several operating situations A, B, C, D and E.

In the apparatus of this figure the loader 20 comprises two rows of suction cups 21a-21b and 22a-22b, each row corresponding with a row of media sheets that may be placed on the moveable tray 40 to be transferred to the printing table.

In situation A, two rows of media sheets S1 and S2 are on the printing table 10, and the tray 40 is in a position accessible to an operator (at the left hand side of the figure), who may place two new rows of print sheets S3 and S4 on its surface.

Figure 2:
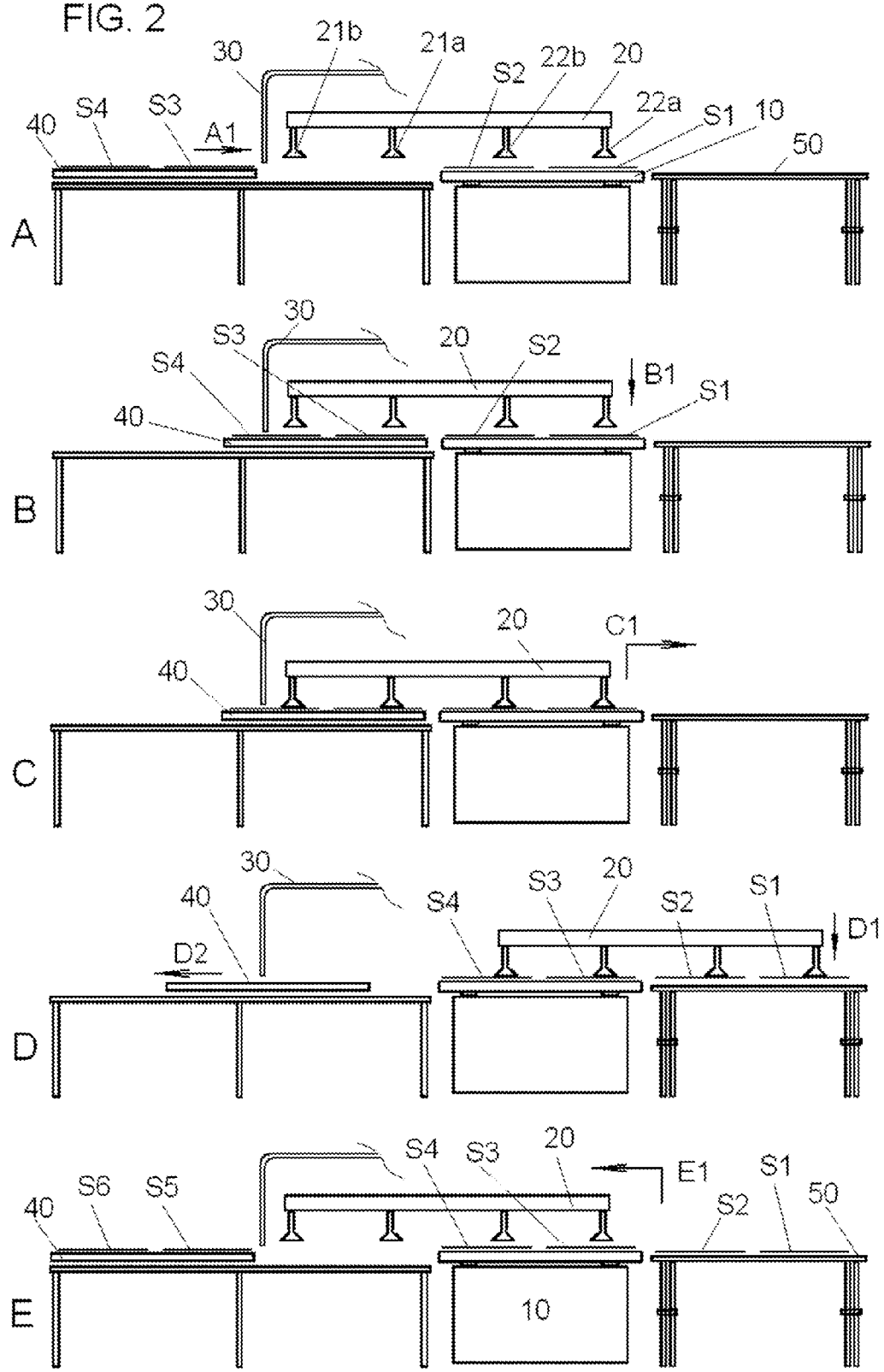
FIG. 2 schematically shows in elevation view another example of a printing apparatus as provided herein, in different operational situations, illustrating an example of a printing method.

The tray 40 may then be slid (arrow A1) to a position partly under the cover 30, as shown in the second drawing of FIG. 2 (situation B), where the rows of sheets S3 and S4 are respectively accessible to the rows of suction cups 21a and 21b of loader 20, while this part of the tray under the influence of the loader 20 is inaccessible to the operator by virtue of cover 30. At the same time, the rows of cups 22a and 22b of the loader are positioned over the rows of printed sheets S1 and S2, respectively.

In situation B, however, part of the tray 40, and part of each sheet of the row of sheets S4, may remain outside the cover 30 and be accessible to the operator, since sheets may be picked up by the cups near their leading edge in the direction of movement, as shown in the figure.

In this situation, the loader 20 is lowered as shown by arrow B1, and all the suction cups are activated to pick up the sheets.

In situation C, the loader 20 raises the four rows of sheets S1, S2, S3 and S4 that have been engaged by respective suction cups, and moves them towards the right in the figure, as shown by arrow C1; as a result, rows of sheets S1 and S2 are transferred towards the reception table 50, while rows of sheets S3 and S4 are transferred towards the printing table 10.

In situation D, the loader 20 descends as shown by arrow D1, and the suction cups release the sheets, such that rows of sheets S1 and S2 are laid on the reception table or lift 50, while rows of sheets S3 and S4 are laid on the printing table 10. At the same time, the tray 40 is withdrawn out of the cover 30, as shown by arrow D2, towards the position in which all or almost all the tray is accessible to the operator.

In situation E the loader has gone back to the initial position, as shown by arrow E1, and the apparatus is again in the operating situation wherein two rows of media sheets (now S3 and S4) are being printed on the printing table, and the tray 40 is being filled with two new rows of print sheets S5 and S6 by an operator.

In examples of printing methods as described in relation to FIG. 2, the apparatus throughput may be increased, while at the same time maintaining satisfactory security conditions: indeed, the operator can load multiple rows at different depths inside the cover 30, such that multiple rows of sheets may be printed simultaneously in the apparatus, and this is done without reaching with hands or other parts of the body the area where the loader is working.

The tray 40 may be moved between the two positions manually by the operator, or by means of a driving arrangement, as will be described later.

Other examples of printing apparatus and printing methods as provided herein are now described with reference to FIG. 3.

Figure 3:
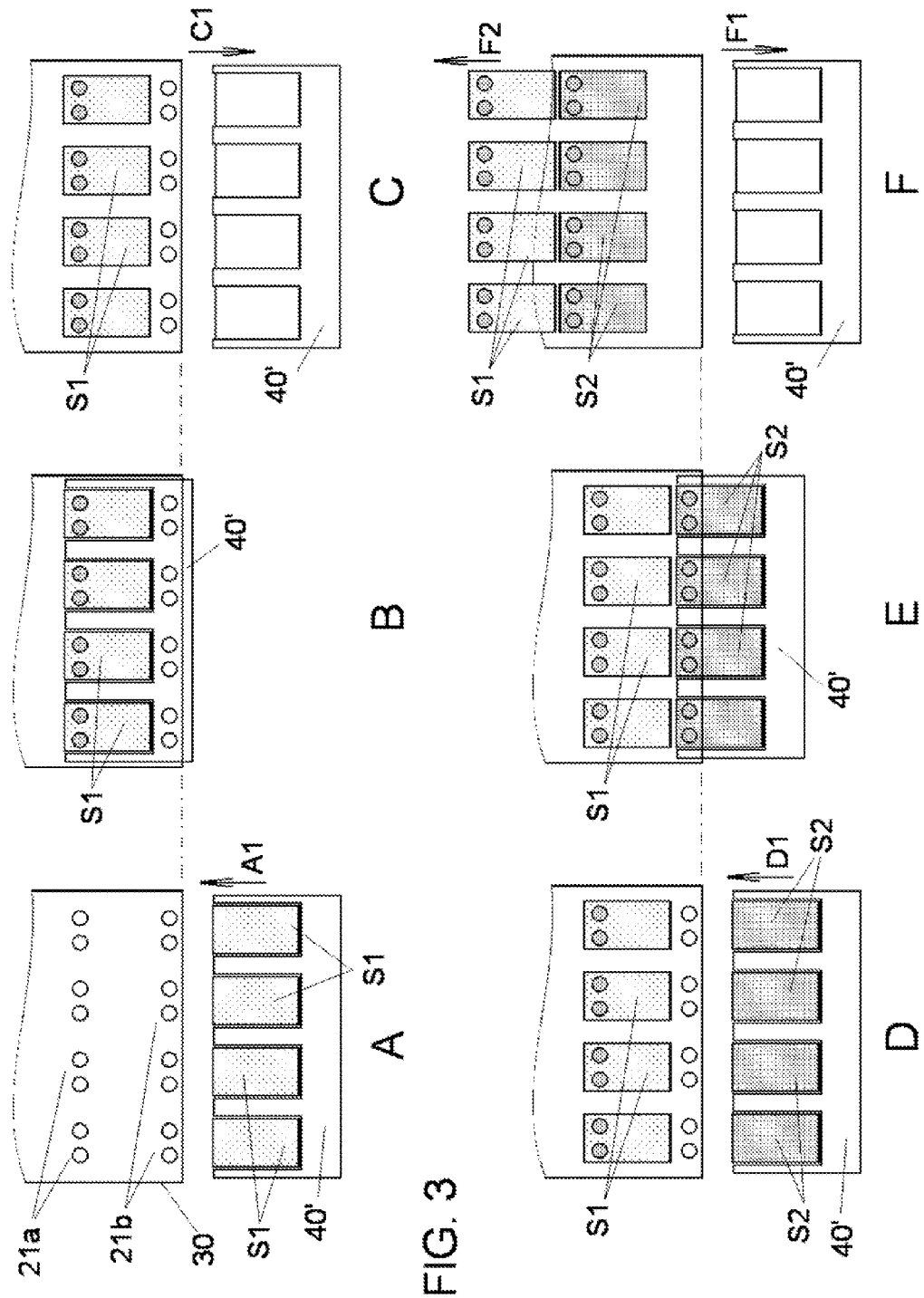
FIG. 3 schematically shows a further example of a printing apparatus in different operational situations, in this case in plan view.

FIG. 3 is a very schematic plan view of an example of a printing apparatus as provided herein, in several operating situations A, B, C, D, E and F. The figure shows a tray 40', a set of suction cups with two rows 21a and 21b belonging to a loader that is otherwise not shown, and a stationary safety cover 30 that encloses at least part of the loader. An operator (not shown) may stand near the edge of the tray 40' that is remote from the cover 30.

The cover 30 is stationary throughout the operation described in the following. In the figure, the end of the cover 30 has been referenced using a dot-and-dash line extending between the drawings that show the different situations A to F.

In situation A, an operator places a first row of four media sheets S1 on the tray 40'. The tray is then moved under the cover 30 in the direction of arrow A1, until it reaches the depth of the first row of suction cups 21a.

In situation B, the first row of sheets S1 is under the cups 21a and most of the tray is under cover 30, inaccessible to the operator except for its trailing part. The loader is lowered, the cups 21a engage the sheets S1 (hatching of the cups in the figure is meant to indicate that vacuum is applied), and the loader is raised again.

Then, in situation C1, the empty tray 40' is withdrawn towards the operator's position as shown by arrow C1.

Next, in situation D, the operator places a second row of media sheets S2 on the tray 40', and the tray is moved under the cover 30 in the direction of arrow D1, until it reaches the depth of the second row of suction cups 21*b*, i.e. a smaller depth than in situation B.

In this case a larger part of the tray 40' remains outside the cover 30 with respect to situation B, but there is a part of the tray 40', with the leading edge of the sheets S2, that is under the cover and inaccessible to the operator.

In situation E, the loader is again lowered, the cups 21*b* engage the sheets S2, and the loader is raised again, now bearing the two rows of sheets S1 and S2.

The empty tray 40' is again withdrawn towards the operator's position in situation F, as shown by arrow F1. At the same time, the loader bearing the sheets S1 and S2 moves in the direction shown by arrow F2, to transfer the sheets to a printing table (not shown).

Two rows of print media sheets S1 and S2 may therefore be loaded on the printing table, and printed simultaneously, thus improving the throughput of the process.

Also disclosed herein are moveable trays for feeding print media to printing apparatus, for example large format flatbed printers, such as trays 40 or 40' described above. Such trays comprise a media support surface which is provided with an array of sheet holders. The sheet holders allow positioning print media sheets at predetermined positions on the surface, and also restrict the movement of the sheets in at least one direction on the media support surface.

In some examples, the sheet holders may restrict the movement of the sheets in a direction opposite to the direction in which, in use, the tray is intended to travel between a position in which it is accessible to an operator for placing media sheets on the media support surface, and another position in which at least part of the tray is inaccessible to the operator and accessible to a loader for picking the print media sheets and transfer them to a printing table of a printing apparatus.

The sheet holders facilitate accurate positioning of the sheets throughout the feeding process, such that the sheets may be accurately positioned on the printing table.

FIGS. 4 and 5 show examples of moveable trays with sheet holders.

In FIG. 4 a tray 40 may comprise an array of sheet holders 41 on a media support surface 42, to position (in the shown example) up to eight print media sheets at predetermined positions on surface 42.

The sheet holders 41 may be configured for example as recesses or pockets, as shown in the figure, into which the sheets may be positioned so that they will be restrained from moving over the surface 42 when the tray travels during use in a printing apparatus as explained for example in relation to FIGS. 1 to 3 above.

Movable trays such as disclosed herein may be integrated or attached to a printing apparatus, or may be stand-alone devices intended to be used in combination with a printing apparatus. An operator may for example place a stand-alone tray on a loading top of the printing apparatus, place sheets on the tray, and slide the tray over the loading top to a position where at least part of the tray is accessible to the loader of the apparatus and is inaccessible to the operator.

The number of rows and the number of sheet holders in each row of the array may vary, depending on the printing apparatus, the size and number of sheets to be printed, etc. For example, FIG. 5 shows a similar example of a tray 40', which has only one row of pockets 41 and may be employed for example as described in relation to FIG. 3 above.

Other configurations of sheet holders are possible. In some examples, sheet holders may comprise vacuum suction elements (not shown): vacuum may be employed in combination with recesses in the surface, for example applying vacuum via a number of through holes in the bottom of each recess, but also in other different configurations of the sheets holders, or as the sheet holder system itself.

In examples of printing apparatus as provided herein, at least part of the tray may be tiltable around a horizontal tilting axis 43 when it is in the position in which it is accessible to an operator. A printing method may comprise placing the media sheets on the tray while the tray is tilted at an angle with respect to a horizontal plane, and then laying the tray horizontal before moving it to said position where the sheets are accessible to a loader.

FIG. 6 shows schematically part of a printing apparatus in two phases of an example of a printing method in which the tray may be tilted at an angle. The figure shows a structure 60 on which a tray 40 may be supported and may slide. The structure 60 may have an inclined portion 61 at the end where the operator may stand to place sheets on the tray 40.

As visible in the first phase of FIG. 6, the operator may rest the tray 40 on the inclined portion 61 of the structure, which may have a stop or abutment to hold the tray 40. In this position, the upper part of the tray 40 is brought closer to the operator, facilitating the placement of sheets in this part of the tray.

After the sheets have been placed of the tray, the operator may tilt the tray 40 back to a horizontal position, as shown in the second phase of the figure, and push it as shown by the arrow towards the position accessible to the loader 20.

Examples of printing apparatus as provided herein may comprise a driving arrangement for tilting the tray and/or for displacing the tray between its two positions. FIG. 7 shows a schematic example of a tray 40" which may be tilted and moved between its two positions by a driving arrangement.

As shown in the figure, a pneumatic cylinder 80 may be provided, for example attached to a supporting structure (not shown). The assembly may be associated with a printing apparatus, or may be a stand-alone device to be arranged on the side of such an apparatus.

A tray 40" may be attached to the piston rod of cylinder 80, in such a way to be rotatable or tiltable around a hinge point 43 that moves with the piston rod.

A second pneumatic cylinder 70 may be also mounted such as to move with the piston rod of cylinder 80. The free end of the piston rod of cylinder 70 may be hinged to an intermediate point 44 under the tray 40", such that the operation of the cylinder 70 may cause rotation of the tray 40" between the horizontal position shown in the figure and a tilted position in which the tray is inclined towards the position of the operator (at the left hand side of the figure).

When the tray 40" is horizontal, the cylinder 80 may bring it from the position of FIG. 7 (accessible to an operator) to a position towards the right, where it may be at least partly accessible to a loader and inaccessible to the operator as indicated by arrow C. In this manner, the tray 40 may be moveable, for example as shown by arrow C, between a position (in solid lines in FIG. 1) in which it is accessible to an operator for placing media sheets thereon, and another position (in dashed lines in FIG. 1) in which at least part of the tray 40 is accessible to the loader 20 for picking the print media sheets, but inaccessible to an operator that is manually laying sheets of print media on the tray 40 as depicted in FIG. 1.

Even though a single cylinder 80 and a single cylinder 70 have been shown in the figure, the structure of such a tray 40" may employ for example two parallel and spaced apart cylinders 80 and two parallel and spaced apart cylinders 70, and frame components as needed to mount the tray and cylinders 70 on the piston rods of cylinders 80.

In examples of a printing apparatus having for example a driving arrangement for moving the tray between the two positions, a sensor 90 may be foreseen to detect the presence of a media sheet on the tray. Such a sensor 90 may be arranged in correspondence with a position on the tray which is intended to receive a media sheet, and cause the movement of the tray when it detects the presence of a sheet. Such a sensor 90 may be placed in a position on the tray intended to be the last place where the operator lays a print media sheet.

In examples of the printing methods and apparatus disclosed herein, the operator may be a human operator, but any automatic pre-set loading machinery may also be employed to place the sheets on the movable tray.

Although only a number of particular embodiments and examples have been disclosed herein, further variants and modifications of the disclosed apparatus and methods are possible; other combinations of the features of embodiments or examples described are also possible.

What is claimed is:

1. A printing apparatus comprising:
    a printing table;
    a loader to load sheets of print media to the printing table;
    a moveable tray on which at least one row of media sheets are placed, said moveable tray being moveable between a position in which it is accessible to an operator for placing media sheets thereon and another position in which at least part of the moveable tray is accessible to the loader for picking the print media sheets but inaccessible to the operator; and
    wherein at least a portion of the moveable tray and a portion of the at least one row of media sheets remain accessible to the operator when the movable tray is in the another position in which at least part of the moveable tray is accessible to the loader;
    wherein the moveable tray comprises a media support surface provided with sheet holders to position print media sheets at predetermined positions on the surface and restrict movement of the sheets in at least one direction on the media support surface;
    wherein the media support surface is provided with an array of the sheet holders to position at least two rows of print media sheets; and
    wherein the loader comprises at least two rows of suction cups, each row corresponding with a row of media sheets placed on the moveable tray.

2. The printing apparatus of claim 1, wherein each sheet holder comprises a recess in the media support surface.

3. The printing apparatus of claim 1, wherein the moveable tray is slidable horizontally between said two positions.

4. The printing apparatus of claim 1, wherein at least part of the moveable tray is tiltable around a horizontal tilting axis when it is in the position in which it is accessible to an operator.

5. The printing apparatus of claim 1, further comprising a driving arrangement for displacing the moveable tray between the two positions.

6. The printing apparatus of claim 5, further comprising a sensor to detect the presence of a media sheet on the moveable tray, arranged in correspondence with a position on the moveable tray which is intended to receive a media sheet,
    wherein, in response to a detection of the media sheet on the moveable tray by the sensor, moving the tray in the another position in which at least part of the moveable tray is accessible to the loader for picking the print media sheets.

* * * * *